(12) United States Patent
Liu et al.

(10) Patent No.: US 10,201,750 B2
(45) Date of Patent: Feb. 12, 2019

(54) METHOD AND APPARATUS OF PRELOADING BROWSER GAME ON CLIENT

(71) Applicant: TENCENT TECHNOLOGY (SHENZHEN) COMPANY LIMITED, Shenzhen (CN)

(72) Inventors: Jun Liu, Shenzhen (CN); Guangkai Liu, Shenzhen (CN); Wentong Li, Shenzhen (CN); Huaquan Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 386 days.

(21) Appl. No.: 15/246,390

(22) Filed: Aug. 24, 2016

(65) Prior Publication Data

US 2016/0361644 A1 Dec. 15, 2016

Related U.S. Application Data

(63) Continuation of application No. PCT/CN2015/078351, filed on May 6, 2015.

(30) Foreign Application Priority Data

May 6, 2014 (CN) .......................... 2014 1 0187435

(51) Int. Cl.
*A63F 13/34* (2014.01)
*A63F 13/335* (2014.01)
(Continued)

(52) U.S. Cl.
CPC ............ *A63F 13/335* (2014.09); *A63F 13/32* (2014.09); *A63F 13/332* (2014.09); *A63F 13/34* (2014.09);
(Continued)

(58) Field of Classification Search
CPC ...... A63F 13/335; A63F 13/32; A63F 13/332; A63F 13/34; A63F 13/35;
(Continued)

(56) References Cited

U.S. PATENT DOCUMENTS 9,565,233 B1 * 2/2017 Ozuysal .............. H04L 67/2842
2014/0024457 A1 * 1/2014 Justice .................. A63F 13/792
463/42

(Continued)

FOREIGN PATENT DOCUMENTS

CN 103106216 A 5/2013
CN 103150192 A 6/2013
(Continued)

OTHER PUBLICATIONS

The World Intellectual Property Organization (WIPO) International Search Report for PCT/CN2015/078351 dated Jul. 31, 2015 pp. 1-4.
(Continued)

*Primary Examiner* — Corbett B Coburn
(74) *Attorney, Agent, or Firm* — Anova Law Group, PLLC

(57) ABSTRACT

The present disclosure discloses a method and an apparatus of preloading a browser game on a client. The method includes: acquiring a browser game preloading instruction pushed by a server, and parsing the preloading instruction to obtain an Internet Protocol (IP) address of the browser game; acquiring a background loading component corresponding to the preloading instruction, where the background loading component is configured to load the browser game on the client; and loading the browser game according to the background loading component and the IP address. In embodiments, a browser game is preloaded before a user (Continued)

enters the browser game, so that the user quickly enters the browser game, thereby improving resource utilization of a browser game server.

13 Claims, 4 Drawing Sheets

(51) Int. Cl.
*H04L 29/08* (2006.01)
*H04L 29/06* (2006.01)
*A63F 13/32* (2014.01)
*A63F 13/332* (2014.01)
*A63F 13/35* (2014.01)

(52) U.S. Cl.
CPC .............. *A63F 13/35* (2014.09); *H04L 67/02* (2013.01); *H04L 67/025* (2013.01); *H04L 67/125* (2013.01); *H04L 67/26* (2013.01); *H04L 67/38* (2013.01); *A63F 2300/407* (2013.01); *A63F 2300/408* (2013.01)

(58) Field of Classification Search
CPC ......... A63F 2300/407; A63F 2300/408; H04L 67/02; H04L 67/025; H04L 67/125; H04L 67/26; H04L 67/38
See application file for complete search history.

(56) References Cited

U.S. PATENT DOCUMENTS

| | | | |
|---|---|---|---|
| 2014/0280677 A1* | 9/2014 | Altman | H04L 67/2847 709/213 |
| 2015/0193395 A1* | 7/2015 | Nicolaou | G06F 17/3053 707/726 |
| 2015/0200994 A1* | 7/2015 | Jain | H04L 67/02 709/219 |
| 2015/0373150 A1* | 12/2015 | Wen | G06F 17/30902 709/213 |
| 2016/0256784 A1* | 9/2016 | Schultz | A63F 13/79 |
| 2016/0306894 A1* | 10/2016 | Liang | G06F 17/30902 |
| 2017/0006128 A1* | 1/2017 | Graham-Cumming | H04L 67/2842 |

FOREIGN PATENT DOCUMENTS

| | | |
|---|---|---|
| CN | 103294881 A | 9/2013 |
| CN | 103297476 A | 9/2013 |
| CN | 103457960 A | 12/2013 |

OTHER PUBLICATIONS

The State Intellectual Property Office of the People's Republic of China (SIPO) Office Action 1 for 201410187435.1 dated Aug. 31, 2018 7 Pages (including translation).

* cited by examiner

METHOD AND APPARATUS OF PRELOADING BROWSER GAME ON CLIENT

CROSS-REFERENCES TO RELATED APPLICATIONS

This application claim priority of PCT Patent Application No. PCT/CN2015/078351, filed on May 6, 2015, which claims priority to Chinese Patent Application No. 2014101874351, entitled "Method and Apparatus of Preloading Browser Game on Client" filed on May 6, 2014, the entire contents of both of which are incorporated herein by reference.

FIELD OF THE TECHNOLOGY

The present disclosure relates to the field of communications technologies, and in particular, to a method and an apparatus of preloading a browser game on a client.

BACKGROUND OF THE DISCLOSURE

With the continuous development and popularity of Internet technologies, users have increasingly high requirements on network entertainment.

Using a browser game as an example, the browser game refers to a game run in a browser, and different from ordinary client games, it does not require special downloading and installation and can be directly opened and run in the browser. At present, for most browser games, a rich client based on rich internet applications (RIA) is embedded in a webpage, and when a user opens the webpage, a browser downloads a related RIA program file locally, and starts to run the file in the browser. That is, in a common scenario, a browser game is downloaded only when a user enters the browser game, which leads to a latency when the browser game is run in a browser, thereby affecting user experience and reducing resource utilization of a browser game server.

Therefore, the present disclosure provides a client based method of preloading a browser game, in which a browser game is preloaded, so that a user quickly enters the browser game, thereby improving resource utilization of a browser game server.

SUMMARY

In view of the above, an embodiment of the present disclosure provides a method and an apparatus of preloading a browser game on a client, to preload a browser game before a user enters the browser game, so that the user quickly enters the browser game, thereby improving resource utilization of a browser game server.

In order to solve the foregoing technical problem, embodiments of the present invention provide the following technical solution.

A method of preloading a browser game on a client includes: acquiring a browser game preloading instruction pushed by a server, and parsing the preloading instruction to obtain an Internet Protocol (IP) address of the browser game; acquiring a background loading component corresponding to the preloading instruction, the background loading component being configured to load the browser game on the client; and loading the browser game according to the background loading component and the IP address.

An apparatus of preloading a browser game on a client includes: an instruction parsing module, configured to acquire a browser game preloading instruction pushed by a server, and parse the preloading instruction to obtain an IP address of the browser game; a loading component acquiring module, configured to acquire a background loading component corresponding to the preloading instruction, the background loading component being configured to load the browser game on the client; and a loading module, configured to load the browser game according to the background loading component and the IP address.

In some embodiments, after acquiring a browser game preloading instruction pushed by a server, a client preloads a browser game by using a background loading component corresponding to the preloading instruction, so that when an input instruction for entering the browser game is acquired, the browser game is quickly entered, thereby improving resource utilization of the browser game server; in addition, the browser game is loaded by using the background loading component corresponding to the preloading instruction, which can ensure normal loading of the browser game.

DESCRIPTION OF EMBODIMENTS

Figure 1:
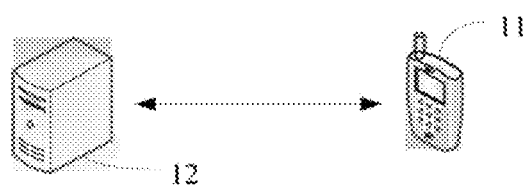
FIG. 1 is a schematic structural diagram of a system of preloading a browser game according to an embodiment of the present invention.

Referring to the drawings, same component symbols represent same components. The principle of the present disclosure is described by using examples in which the present disclosure is implemented in proper computing environments. The following descriptions are specific embodiments of the present disclosure based on the examples, and should not be construed as a limitation to other specific embodiments of the present invention that are not described herein in detail.

In the description that follows, the present disclosure will be described with reference to steps and symbolic representations of operations that are performed by one or more computers, unless indicated otherwise. As such, it will be understood that such steps and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the present disclosure is being described in the foregoing context, it is not meant to be limiting as those of skill in the art will appreciate that several of the steps and operation described hereinafter may also be implemented in hardware.

The principle of the present disclosure is performed by using many other general-purpose or specific-purpose operations, communications environments, or configurations. A well-known example which is applicable to a computing system, an environment, and a configuration of the present disclosure may include (but not limited to) a computing device, such as a handheld phone, a personal computer (PC), a server, a multiprocessor system, a microcomputer dedicated system, a host architecture type computer, and a distributed computing environment, which include any one of the foregoing systems or apparatuses.

The term "module" used in the specification may be regarded as a software object executed in the computing system. Different components, modules, engines, and services described in the specification may be regarded as software and hardware objects implemented in the computing system. The apparatus and method described in the specification are preferably implemented in a form of software, and certainly may also be implemented in a form of hardware, or a combination thereof, all of which fall within the protection scope of the present disclosure.

Referring to FIG. 1, FIG. 1 is a schematic structural diagram of a system of preloading a browser game according to an embodiment of the present invention. The system of preloading a browser game includes a client 11 and a server 12.

The client 11 is a communications terminal apparatus that is used by a user to use a network service, and may be connected to the server 12 through a communications network. The client 11 may be a desktop computer, and may also be a terminal that has a storage device and has a computing capability due to its storage medium and an installed processor, such as a notebook computer, a workstation, a palmtop computer, an ultra mobile personal computer (UMPC), a tablet PC, a personal digital assistant (PDA), a web pad, or a portable phone. In one embodiment, a method of preloading a browser game, a browser game box may be installed in the client 11, so as to run the browser game in the client 11 by using the browser game box.

The communications network between the client 11 and the server 12 may include data communication networks including a local area network (LAN), a metropolitan area network (MAN), a wide area network (WAN), and the Internet, and may further include a telephone network and the like. The communications network may be a wired one or a wireless one, and it is suitable to use any communication manner. The server 12 may include any type of server computer with a storage medium and one or more processors. The server 12 may be a computer program or a device that provides functionality for other programs or device, such as client 11. Servers 12 can provide various services, such as sharing data or resources among multiple clients 11, or performing computation for a client 11.

In one embodiment of the present invention, the server 12 may push a browser game preloading instruction to the client 11 according to information about a browser game ranking list acquired from the Internet or information about a browser game recommended by a game player in the Internet, where a time interval is set for the pushing. After receiving the preloading instruction, the client 11 parses the preloading instruction and obtains an IP address of a pushed browser game, and the client 11 acquires a user invisible background loading component, and loads the pushed browser game according to the IP address by using the background loading component into a storage medium, so that when the client 11 receives an input instruction for entering the browser game, the browser game can be quickly entered, thereby improving resource utilization of the browser game server.

Figure 2:
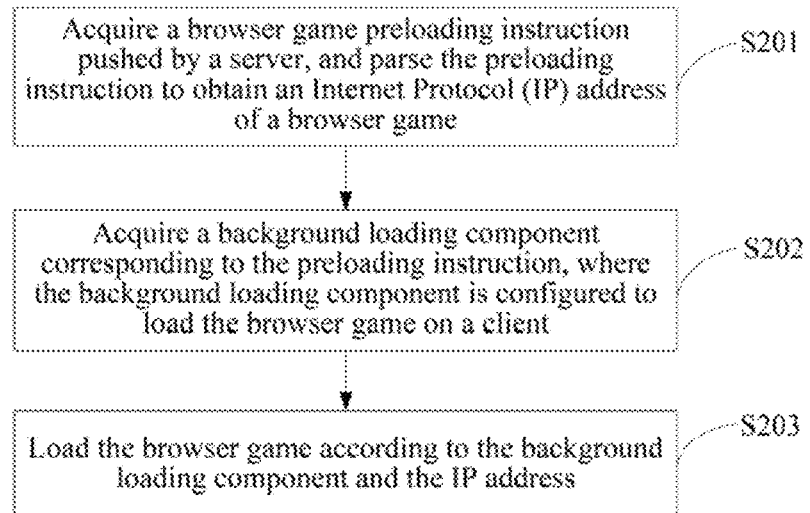
FIG. 2 is a schematic flowchart of a method of preloading a browser game on a client according to a first embodiment of the present invention.

Referring to FIG. 2, FIG. 2 is a schematic flowchart of a method of preloading a browser game on a client according to a first embodiment of the present invention.

Step S201: Acquire a browser game preloading instruction pushed by the server 12, and parse the preloading instruction to obtain an IP address of the browser game.

The method of preloading a browser game is executed by the client 11, where the client 11 may include a terminal that has a storage device and has a computing capability due to an installed processor, such as a desktop computer, a notebook computer, a workstation, a palmtop computer, a UMPC, a tablet PC, a PDA, a web pad, or a portable phone, and a browser game box is installed in the client 11.

It may be understood that, the server 12 may obtain, according to information about a browser game ranking list acquired from the Internet or information about a browser game recommended by a game player in the Internet, a browser game that needs to be pushed to the client 11, generate a browser game preloading instruction, and send the preloading instruction to the client 11. The preloading instruction includes prompt information of the recommended browser game, which is displayed in a foreground browser window of the client 11.

Step S202: Acquire a background loading component corresponding to the preloading instruction, where the background loading component is configured to load the browser game on the client.

It may be understood that, while the browser game preloading instruction pushed by the server 12 is acquired, the background loading component corresponding to the preloading instruction may be acquired, for example, the background loading component corresponding to the preloading instruction may be generated according to the preloading instruction; or a prebuilt background loading component is selected as the background loading component corresponding to the preloading instruction. The background loading component is a user invisible rendering component, and is configured to load the browser game on a background of the client 11.

In this embodiment of the present invention, the background loading component may be a background browser window hidden in an interface of the client, for example, may include an IE window, a Google Chrome window, and a Firefox window. Acquiring and operating the background browser window do not affect the foreground browser window.

To better understand definitions of the background browser window and the foreground browser window, analysis and description are provided below by using a page of the client 11 and corresponding states. Each page of the client 11 basically has a same life cycle, including: the create, start, recover, suspend, stop, and destroy steps. The life cycle corresponds to 4 states: an active state, a suspended state, a stopped state, and an inactive state.

For one page, creating, starting, and recovering processes correspond to a process of switching the page to the active state, where the active state is also referred to as a running state. The page in the active state is located at an uppermost layer in a user interface, and the page is displayed foremost in the interface, which can be seen by a user completely, and can interact with the user. In some scenarios, the page in the active state is also referred to as a foreground process page, that is, corresponds to the foreground browser window in the present disclosure.

A suspending process corresponds to a process of switching the page to the suspended state. The page switches to the suspended state loses focus, and the page is partially blocked, which is not at the uppermost layer of the user interface anymore, and cannot interact with the user, but the page in the suspended state still remains active (for example, keeps all state and member information and keeps connected to a window manager).

A stopping process corresponds to a process of switching the page to the stopped state. The window of the page in the stopped state is hidden, and therefore the page cannot be seen in the interface by the user completely. That is, the page in the stopped state corresponds to the background browser window of the present disclosure, but the page still remains active (for example, keeps all state and member information and keeps connected to the window manager).

A destroying process corresponds to a process of switching the page to the inactive state. The page in the inactive state is deleted, to release system memory, and the deleted page does not remain active anymore.

It is easily conceived that, when the browser game preloading instruction pushed by the server 12 is acquired, the client 11 may first parse the preloading instruction and then acquire the background loading component, or may first acquire the background loading component and then parse the preloading instruction. Alternatively, the two are simultaneously executed; the execution order does not constitute any limitation to the present disclosure.

Step S203: Load the browser game according to the background loading component and the IP address.

As can be known from above, in this embodiment, after acquiring a browser game preloading instruction pushed by the server 12, the client 11 preloads a browser game by using a background loading component corresponding to the preloading instruction, so that when an input instruction for entering the browser game is acquired, the browser game is quickly entered, thereby improving resource utilization of the browser game server. In addition, the pushed browser game preloading instruction uses the background loading component corresponding to the preloading instruction, which can ensure normal loading of the browser game.

Figure 3:
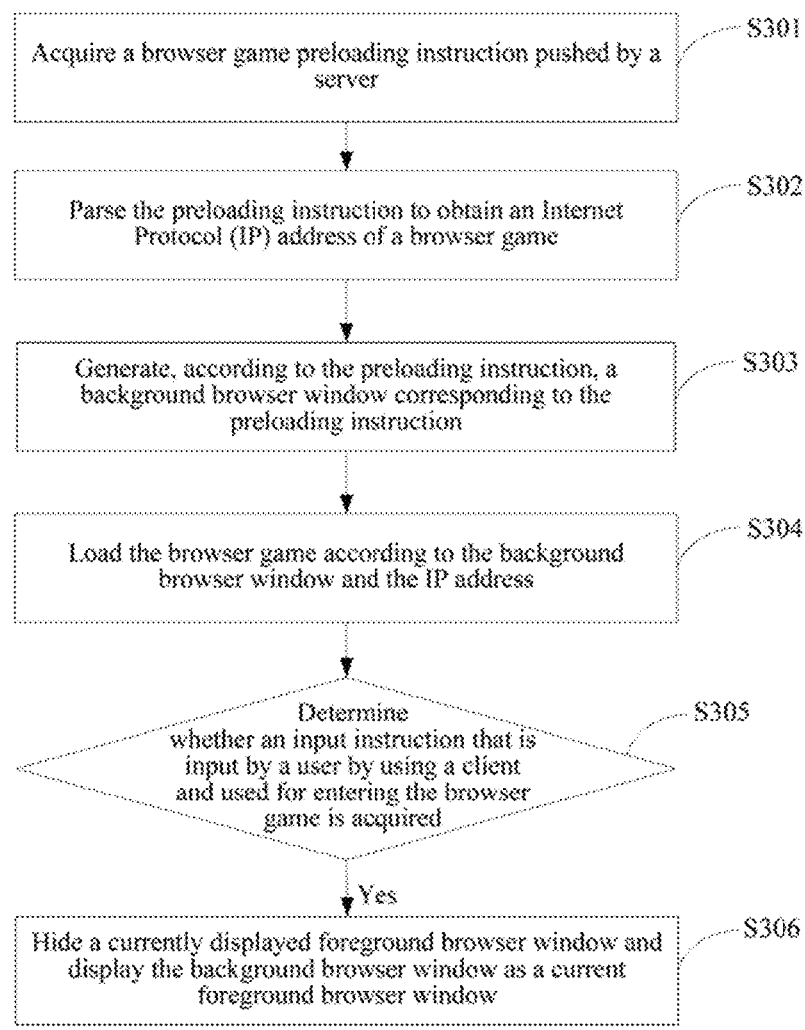
FIG. 3 is a schematic flowchart of a method of preloading a browser game on a client according to a second embodiment of the present invention.

Referring to FIG. 3, FIG. 3 is a schematic flowchart of a method of preloading a browser game on a client according to a second embodiment of the present invention. In the second embodiment, the background loading component is a background browser window hidden in the interface of the client.

Step S301: Acquire a browser game preloading instruction pushed by the server 12.

Step S302: Parse the preloading instruction to obtain an IP address of the browser game.

It may be understood that, the server 12 may obtain, according to information about a browser game ranking list acquired from the Internet or information about a browser game recommended by a game player in the Internet, a browser game that needs to be pushed to the client 11, generate a browser game preloading instruction, and send the preloading instruction to the client 11. The preloading instruction includes prompt information of the recommended browser game, which is displayed in a foreground browser window of the client 11.

Step S303: Generate, according to the preloading instruction, a background browser window corresponding to the preloading instruction.

For a page of the client 11, a page in an active state is located at an uppermost layer in a user interface, and the page is displayed foremost in the interface, which completely can be seen by a user, and can interact with the user. In some scenarios, the page in the active state is also referred to as a foreground process page, that is, corresponds to a foreground browser window in the present disclosure. A stopping process corresponds to a process of switching the page to a stopped state. A window of the page in the stopped state is hidden, and therefore the page completely cannot be seen in the interface by the user, that is, corresponds to the background browser window of the present disclosure.

It may be understood that, because after loading the browser game, the background browser window may execute another loading instruction sent from the server or a preloading instruction that is intelligently predetermined by the client 11, when the user clicks to enter the recommended browser game, in the background browser window, an actually loaded browser game may be different from the recommended browser game. Based on this, the background browser window is acquired after the client 11 acquires the preloading instruction, and it is ensured that the browser game recommended by the server 12 is preloaded by using a background browser window corresponding to the browser game, that is, different background browser windows are used according to different types of preloading instructions, so as to ensure normal loading of the browser game.

If the client 11 receives the browser game preloading instruction pushed by the server for the first time, the client 11 may generate, according to the preloading instruction, the background browser window corresponding to the preloading instruction.

It is also easily conceived that, when the browser game preloading instruction pushed by the server 12 is acquired, the client 11 may first parse the preloading instruction and then acquire the background loading component, or may first acquire the background loading component and then parse the preloading instruction, or the two are simultaneously executed; the execution order does not constitute any limitation to the present disclosure.

Step S304: Load the browser game according to the background browser window and the IP address.

Preferably, the browser game is loaded according to the background browser window and the IP address by means of a peer-to-peer (P2P) network, and/or segmented downloading, and/or resumable transfer.

Step S305: Determine whether an input instruction that is entered by a user by using the client and used for entering the browser game is acquired.

Step S306: Hide a currently displayed foreground browser window and display the background browser window as a current foreground browser window if determining that the input instruction is acquired.

That the client 11 acquires an input instruction for entering the browser game may be understood as that the user clicks, by using the client 11, a link or another entrance on the prompt information of the browser game recommended by the server 12, to enter the recommended browser game.

When the input instruction is acquired, the client 11 hides the foreground browser window, and displays the background browser window with a same size at a same location as the original foreground browser window, that is, the original background browser window serves as a foreground window, and is located at the uppermost layer in the interface of the client 11, and the page is displayed foremost in the interface of the client 11, which completely can be seen by the user, and can interact with the user; and the original foreground browser window serves as a background window, that is, the original foreground browser window is hidden, and the window page completely cannot be seen in the interface by the user.

As can be known from above, in this embodiment, after acquiring a browser game preloading instruction pushed by the server 12, the client 11 preloads a browser game by using a background browser window corresponding to the preloading instruction, so that when an input instruction for entering the browser game is acquired, the browser game is quickly entered, thereby improving resource utilization of the browser game server; in addition, the pushed browser game preloading instruction uses the background browser window corresponding to the preloading instruction, which can ensure normal loading of the browser game.

Figure 4:
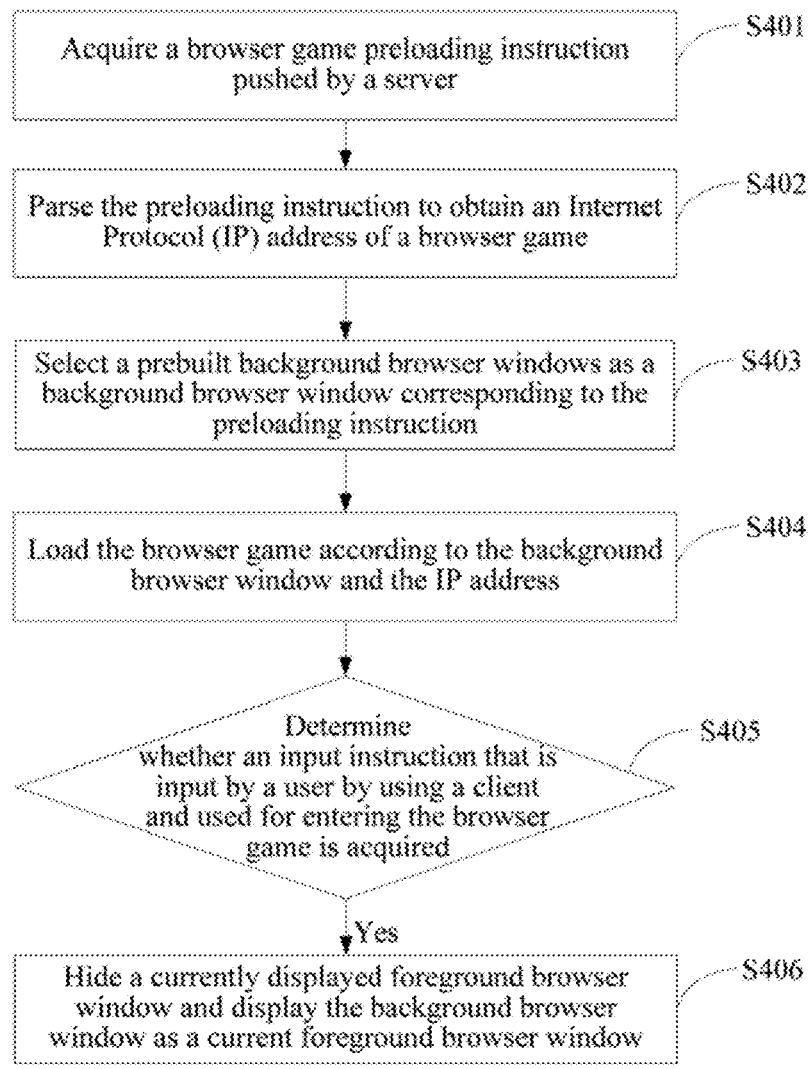
FIG. 4 is a schematic flowchart of a method of preloading a browser game on a client according to a third embodiment of the present invention.

Referring to FIG. 4, FIG. 4 is a schematic flowchart of a method of preloading a browser game on a client according to a third embodiment of the present invention. In the third embodiment, the background loading component is a background browser window hidden in the interface of the client.

Step S401: Acquire a browser game preloading instruction pushed by the server 12.

Step S402: Parse the preloading instruction to obtain an IP address of the browser game.

It may be understood that, the server 12 may obtain, according to information about a browser game ranking list acquired from the Internet or information about a browser game recommended by a game player in the Internet, a browser game that needs to be pushed to the client 11, generate a browser game preloading instruction, and send the preloading instruction to the client 11. The preloading instruction includes prompt information of the recommended browser game, which is displayed in a foreground browser window of the client 11.

Step S403: Select a prebuilt background browser window as a background browser window corresponding to the preloading instruction.

For a page of the client 11, a page in an active state is located at an uppermost layer in a user interface, and the page is displayed foremost in the interface, which completely can be seen by a user, and can interact with the user. In some scenarios, the page in the active state is also referred to as a foreground process page, that is, corresponds to a foreground browser window in the present disclosure. A stopping process corresponds to a process of switching the page to a stopped state. A window of the page in the stopped state is hidden, and therefore the page completely cannot be seen in the interface by the user, that is, corresponds to the background browser window of the present disclosure.

It may be understood that, because after loading the browser game, the background browser window may execute another loading instruction sent from the server or a preloading instruction that is intelligently predetermined by the client 11, when the user clicks to enter the recommended browser game, in the background browser window, an actually loaded browser game may be different from the recommended browser game. Based on this, the background browser window is acquired after the client 11 acquires the preloading instruction, and it is ensured that the browser game recommended by the server 12 is preloaded by using a background browser window corresponding to the browser game, that is, different background browser windows are used according to different types of preloading instructions, so as to ensure normal loading of the browser game.

If the client 11 acquires the browser game preloading instruction pushed by the server for the second time, loading may be performed by using a background browser window that is built during the first time of preloading instruction reception (that is, a prebuilt background browser window).

It is also easily conceived that, when the browser game preloading instruction pushed by the server 12 is acquired, the client 11 may first parse the preloading instruction and then acquire the background loading component, or may first acquire the background loading component and then parse the preloading instruction. The two can also be simultaneously executed; the execution order does not constitute any limitation to the present disclosure.

Step S404: Load the browser game according to the background browser window and the IP address.

Preferably, the browser game is loaded according to the background browser window and the IP address by means of a P2P network, and/or segmented downloading, and/or resumable transfer.

Step S405: Determine whether an input instruction that is entered by a user by using the client and used for entering the browser game is acquired.

Step S406: Hide a currently displayed foreground browser window and display the background browser window as a current foreground browser window if determining that the input instruction is acquired.

That the client 11 acquires an input instruction for entering the browser game may be understood as that the user clicks, by using the client 11, a link or another entrance on the prompt information of the browser game recommended by the server 12, to enter the recommended browser game.

When the input instruction is acquired, the client 11 hides the foreground browser window, and displays the background browser window with a same size at a same location as the original foreground browser window, that is, the original background browser window serves as a foreground window, and is located at the uppermost layer in the interface of the client 11, and the page is displayed foremost in the interface of the client 11, which completely can be seen by the user, and can interact with the user; and the original foreground browser window serves as a background window, that is, the original foreground browser window is hidden, and the window page completely cannot be seen in the interface by the user.

As can be known from above, in this embodiment, after acquiring a browser game preloading instruction pushed by the server 12, the client 11 preloads a browser game by using a background browser window corresponding to the preloading instruction, so that when an input instruction for entering the browser game is acquired, the browser game is quickly entered, thereby improving resource utilization of the browser game server; in addition, the pushed browser game preloading instruction uses the background browser window corresponding to the preloading instruction, which can ensure normal loading of the browser game.

Figure 5:
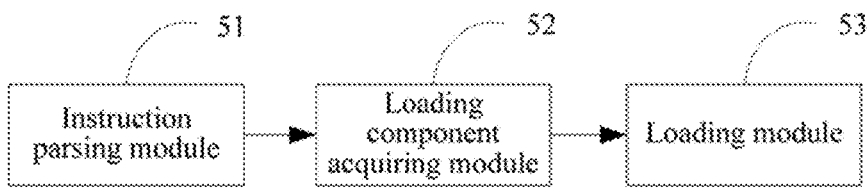
FIG. 5 is a schematic structural diagram of an apparatus of preloading a browser game on a client according to an embodiment of the present invention.

To better implement the method of preloading a browser game on a client provided in some embodiments of the present invention, embodiments of the present invention further provide an apparatus based on the foregoing method of preloading a browser game on a client. Nouns have same meanings as that in the foregoing method of preloading a browser game on a client, and for specific implementation details, reference may be made to the description in the method embodiments. Referring to FIG. 5, FIG. 5 is a schematic structural diagram of an apparatus of preloading a browser game on a client according to an embodiment of the present invention. The apparatus of preloading a browser game on a client includes: an instruction parsing module 51, a loading component acquiring module 52, and a loading module 53.

The instruction parsing module 51 includes computer programs stored in the memory of the client 11. When executed by a processor of the client 11, the instruction parsing module 51 is configured to acquire a browser game preloading instruction pushed by a server 12, and parse the preloading instruction to obtain an IP address of the browser game. The loading component acquiring module 52 includes computer programs stored in the memory of the client 11. When executed by a processor of the client 11, the loading component acquiring module 52 is configured to acquire a background loading component corresponding to the preloading instruction, where the background loading component is configured to load the browser game on the client.

The loading module 53 includes computer programs stored in the memory of the client 11. When executed by a processor of the client 11, the loading module 53 is configured to load the browser game according to the background loading component acquired by the loading component acquiring module 52 and the IP address obtained by the instruction parsing module 51 by parsing.

The client may include a terminal that has a storage device and has a computing capability due to an installed processor, such as a desktop computer, a notebook computer, a workstation, a palmtop computer, a UMPC, a tablet PC, a PDA, a web pad, or a portable phone, and a browser game box is installed in the client.

It may be understood that, the server may obtain, according to information about a browser game ranking list acquired from the Internet or information about a browser game recommended by a game player in the Internet, a browser game that needs to be pushed to the client, generate a browser game preloading instruction, and send the preloading instruction to the client. The preloading instruction includes prompt information of the recommended browser game, which is displayed in a foreground browser window of the client.

It may be understood that, while the browser game preloading instruction pushed by the server is acquired, the loading component acquiring module 52 may acquire the background loading component corresponding to the preloading instruction. The background loading component is a user invisible rendering component, and is configured to load the browser game on a background of the client.

In this embodiment of the present invention, the background loading component may be a background browser window hidden in an interface of the client, for example, may include an IE window, a Google Chrome window, and a Firefox window. Acquiring and operating of the background browser window do not affect the foreground browser window.

As can be known from above, in this embodiment, after a browser game preloading instruction pushed by a server is acquired, a browser game is preloaded by using a background loading component corresponding to the preloading instruction, so that when an input instruction for entering the browser game is acquired, the browser game is quickly entered, thereby improving resource utilization of the browser game server; in addition, the pushed browser game preloading instruction uses the background loading component corresponding to the preloading instruction, which can ensure normal loading of the browser game.

Figure 6:
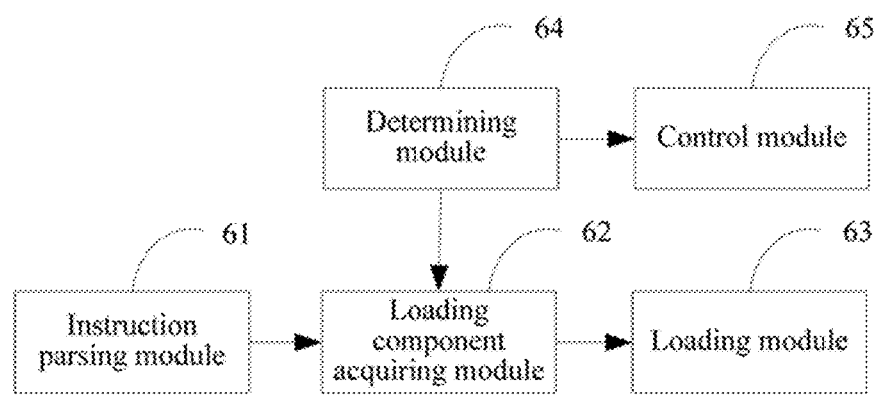
FIG. 6 is another schematic structural diagram of an apparatus of preloading a browser game on a client according to an embodiment of the present invention.

Referring to FIG. 6, FIG. 6 is another schematic structural diagram of a client according to an embodiment of the present invention. The client includes: an instruction parsing module 61, a loading component acquiring module 62, and a loading module 63.

The instruction parsing module 61 includes computer programs stored in the memory of the client. When executed by a processor of the client, the instruction parsing module 61 is configured to acquire a browser game preloading instruction pushed by a server, and parse the preloading instruction to obtain an IP address of the browser game.

In some implementation, the loading component acquiring module 62 includes computer programs stored in the memory of the client 11. When executed by a processor of the client 11, the component acquiring module 62 may generate, according to the preloading instruction, a background loading component corresponding to the preloading instruction. In some implementation, the loading component acquiring module 62 may select a prebuilt background loading component as a background loading component corresponding to the preloading instruction. The loading module 63 includes computer programs stored in the memory of the client 11. When executed by a processor of the client 11, the loading module 63 further loads, by means of a P2P network, and/or segmented downloading, and/or resumable transfer, the browser game according to the background loading component acquired by the loading component acquiring module 62 and the IP address obtained by the instruction parsing module 61 by parsing.

Preferably, if the background loading component is a background browser window hidden in an interface of the client, the loading component acquiring module 62 is responsible for acquiring a background browser window corresponding to the preloading instruction, where the background browser window is configured to load the browser game on the client.

For a display page of the client, a page in an active state is located at an uppermost layer in a user interface, and the page is displayed foremost in the interface, which completely can be seen by a user, and can interact with the user. In some scenarios, the page in the active state is also referred to as a foreground process page, that is, corresponds to a foreground browser window in the present disclosure. A stopping process corresponds to a process of switching the page to a stopped state. A window of the page in the stopped state is hidden, and therefore the page completely cannot be seen in the interface by the user, that is, corresponds to the background browser window of the present disclosure.

It may be understood that, because after loading the browser game, the background browser window may execute another loading instruction sent from the server or a preloading instruction that is intelligently predetermined by a browser game loading apparatus, when the user clicks to enter the recommended browser game, in the background browser window, an actually loaded browser game may be different from the recommended browser game. Based on this, the background browser window is acquired after the preloading instruction is acquired, and it is ensured that the browser game recommended by the server is preloaded by using the background browser window corresponding to the browser game, that is, different background browser windows are used according to different types of preloading instructions, so as to ensure normal loading of the browser game.

Further, the browser game loading apparatus of the client may further include a determining module 64, which determines whether an input instruction that is entered by a user by using the client and used for entering the browser game is acquired; and a control module 65, which hides a currently displayed foreground browser window and displays the background browser window as a current foreground browser window if it is determined that the input instruction is acquired.

That an input instruction for entering the browser game is acquired may be understood as that the user clicks, by using the client, a link or another entrance on the prompt information of the browser game recommended by the server, to enter the recommended browser game.

Specifically, when it is determined that the input instruction is acquired, the control module 65 hides the foreground browser window, and displays the background browser window with a same size at a same location as the original foreground browser window, that is, the original background browser window serves as a foreground window, and is located at the uppermost layer in the interface of the client, and the page is displayed foremost in the interface of the client, which completely can be seen by the user, and can interact with the user; and the original foreground browser window serves as a background window, that is, the original foreground browser window is hidden, and the window page completely cannot be seen in the interface by the user.

As can be known from above, in this embodiment, after a browser game preloading instruction pushed by a server is acquired, a browser game is preloads by using a background browser window corresponding to the preloading instruction, so that when an input instruction for entering the browser game is acquired, the browser game is quickly entered, thereby improving resource utilization of the browser game server; in addition, the pushed browser game preloading instruction uses the background browser window corresponding to the preloading instruction, which can ensure normal loading of the browser game.

In the foregoing embodiments, the descriptions of the embodiments have respective focuses, for the part that is not described in detail in an embodiment, reference may be made to the foregoing detailed description of the method of preloading a browser game on a client, and details are not described herein again.

The apparatus of preloading a browser game on a client provided in some embodiments of the present invention may be, for example, a computer, a tablet computer, or a mobile phone having a touch function. The apparatus of preloading a browser game on a client and the method of preloading a browser game on a client in the foregoing embodiments are based on the same conception, and any method provided in some embodiments of the method of preloading a browser game on a client may be implemented on the apparatus of preloading a browser game on a client. For a specific implementation process, refer to the embodiments of the method of preloading a browser game on a client. Details are not described herein again.

It should be noted that, persons of ordinary skill in the art may understand that, all or some of the processes of the method of preloading a browser game on a client according to the embodiments of the present invention may be implemented by a computer program controlling relevant hardware. The computer program may be stored in a computer readable storage medium, for example, stored in a memory of a terminal, and executed by at least one processor in the terminal, where the execution process may include the processes of the embodiments of the method of preloading a browser game on a client. The storage medium may be a magnetic disk, an optical disc, a read-only memory (ROM), a random access memory (RAM), or the like.

For the client in some embodiments of the present invention, the functional modules thereof may be integrated into one processing chip, or each of the modules may exist alone physically, or two or more modules may be integrated into one module. The integrated module may be implemented in a form of hardware, or may be implemented in a form of a software functional module. When the integrated module is implemented in a form of a software functional module and sold or used as an independent product, the integrated module may be stored in a computer-readable storage medium. The storage medium may be, for example, a ROM, a magnetic disk, or an optical disc.

To sum up, although the present disclosure has been disclosed by using preferred embodiments, the preferred embodiments are not intended to limit the present disclosure, and a person of ordinary skill in the art may make various modifications and improvements without departing from the spirit and scope of the present disclosure; therefore, the protection scope of the present disclosure should be subject to the scope defined by the claims.

What is claimed is:

1. A method of preloading a browser game on a client, comprising:
    acquiring a browser game preloading instruction pushed by a server, and parsing the preloading instruction to obtain an Internet Protocol (IP) address of the browser game;
    acquiring a background loading component corresponding to the preloading instruction, the background loading component being configured to load the browser game on the client; and
    loading the browser game according to the background loading component and the IP address.

2. The method according to claim 1, wherein the acquiring a background loading component corresponding to the preloading instruction, comprises:
    generating, according to the preloading instruction, the background loading component corresponding to the preloading instruction.

3. The method according to claim 1, wherein the acquiring a background loading component corresponding to the preloading instruction, comprises:
    selecting a prebuilt background loading component as the background loading component corresponding to the preloading instruction.

4. The method according to claim 1, wherein the background loading component is a background browser window hidden in an interface of the client.

5. The method according to claim 4, wherein after the step of acquiring a background loading component corresponding to the preloading instruction, the method further comprises:
    determining whether an input instruction that is entered by a user by using the client and used for entering the browser game is acquired; and
    hiding a currently displayed foreground browser window and displaying the background browser window as a current foreground browser window if determining that the input instruction is acquired.

6. The method according to claim 1, wherein the step of loading the browser game according to the background loading component and the IP address comprises:
    loading the browser game according to the background loading component and the IP address by means of a peer-to-peer (P2P) network, a segmented downloading, and a resumable transfer.

7. An apparatus of preloading a browser game on a client, comprising:
    an instruction parsing module, configured to acquire a browser game preloading instruction pushed by a server, and parse the preloading instruction to obtain an Internet Protocol (IP) address of the browser game;

a loading component acquiring module, configured to acquire a background loading component corresponding to the preloading instruction, the background loading component being configured to load the browser game on the client; and a loading module, configured to load the browser game according to the background loading component and the IP address.

8. The apparatus according to claim 7, wherein the loading component acquiring module is further configured to generate, according to the preloading instruction, the background loading component corresponding to the preloading instruction.

9. The apparatus according to claim 7, wherein the loading component acquiring module is further configured to select a prebuilt background loading component as the background loading component corresponding to the preloading instruction.

10. The apparatus according to claim 7, wherein the loading component acquiring module is further configured to acquire a background browser window that corresponds to the preloading instruction and is hidden in an interface of the client, wherein the background browser window is configured to load the browser game on the client.

11. The apparatus according to claim 10, further comprising:

a determining module, configured to determine whether an input instruction that is entered by a user by using the client and used for entering the browser game is acquired; and a control module, configured to hide a currently displayed foreground browser window and display the background browser window as a current foreground browser window if it is determined that the input instruction is acquired.

12. The apparatus according to claim 7, wherein the loading module is further configured to load the browser game according to the background loading component and the IP address by means of a P2P network, a segmented downloading, and a resumable transfer.

13. A non-transitory computer readable storage medium having stored one or more computer readable instructions, which, when executed by a computing device, cause the computing device to:

acquire a browser game preloading instruction pushed by a server, and parsing the preloading instruction to obtain an Internet Protocol (IP) address of the browser game;

acquire a background loading component corresponding to the preloading instruction, the background loading component being configured to load the browser game on the client; and load the browser game according to the background loading component and the IP address.

* * * * *